(12) United States Patent
Reyment

(10) Patent No.: US 9,572,331 B1
(45) Date of Patent: Feb. 21, 2017

(54) VARIABLE DEPTH FISHING LURE

(71) Applicant: Andrew J. Reyment, Green Bay, WI (US)

(72) Inventor: Andrew J. Reyment, Green Bay, WI (US)

( * ) Notice: Subject to any disclaimer, the term of this patent is extended or adjusted under 35 U.S.C. 154(b) by 203 days.

(21) Appl. No.: 14/620,228

(22) Filed: Feb. 12, 2015

(51) Int. Cl.
  *A01K 85/00* (2006.01)
  *A01K 85/18* (2006.01)
  *A01K 85/16* (2006.01)

(52) U.S. Cl.
  CPC .............. *A01K 85/00* (2013.01); *A01K 85/16* (2013.01)

(58) Field of Classification Search
  CPC ......... A01K 85/00; A01K 85/16; A01K 85/18
  See application file for complete search history.

(56) References Cited

U.S. PATENT DOCUMENTS

| | | | | |
|---|---|---|---|---|
| 2,455,155 A * | 11/1948 | Baima | ............. | A01K 85/16 43/42.02 |
| 2,494,384 A * | 1/1950 | Gadzinski | ............. | A01K 85/16 43/42.09 |
| 2,776,517 A * | 1/1957 | Ingvar | ............. | A01K 85/16 43/42.22 |
| 2,945,318 A * | 7/1960 | Lassiter | ............. | A01K 85/16 43/42.09 |
| 3,902,267 A * | 9/1975 | Monchil | ............. | A01K 85/16 43/42.23 |
| 3,950,882 A * | 4/1976 | Monchil | ............. | A01K 85/16 43/42.23 |
| 4,215,507 A * | 8/1980 | Russell | ............. | A01K 85/16 43/42.22 |
| 4,869,014 A * | 9/1989 | Francklyn | ............. | A01K 83/06 43/42.47 |
| 4,944,112 A * | 7/1990 | Garmany | ............. | A01K 85/16 43/42.09 |
| 5,182,875 A * | 2/1993 | Righetti | ............. | A01K 85/18 43/42.09 |
| 5,329,721 A * | 7/1994 | Smith | ............. | A01K 85/16 43/42.22 |
| 5,337,508 A * | 8/1994 | Pfeiffer | ............. | A01K 85/16 43/42.03 |
| D396,261 S * | 7/1998 | Duncan | ............. | D22/126 |
| 6,041,539 A * | 3/2000 | Huang | ............. | A01K 85/16 43/42.22 |
| 6,101,758 A * | 8/2000 | Finley | ............. | A01K 85/16 43/42.22 |

(Continued)

*Primary Examiner* — Christopher P Ellis
*Assistant Examiner* — Michael Wang
(74) *Attorney, Agent, or Firm* — Donald J. Ersler

(57) ABSTRACT

A variable depth fishing lure preferably includes a hollow body, an adjustable bill, a spring pin, a spring retainer and at least one hook. The hollow body preferably includes a first body half and a second body half. At least two horizontal bill slots are formed on a front of the hollow body to receive the adjustable bill. The spring pin is pivotally engaged with the adjustable bill. The spring retainer is pivotally retained in the hollow body. The spring pin is inserted into the spring retainer and through a compression spring. The opposing end of the spring pin is terminated to retain the compression spring. A hooking device preferably includes a multi-position line eyelet, a hook line and at least one hook. The hook line extends from the multi-position line eyelet and at least one hook extends from an opposing end of the hook line.

14 Claims, 4 Drawing Sheets

(56) References Cited

U.S. PATENT DOCUMENTS

| | | | | |
|---|---|---|---|---|
| 8,028,464 | B2* | 10/2011 | Smith | A01K 85/16 43/42.09 |
| 8,720,104 | B2* | 5/2014 | Smith | A01K 85/16 43/42.22 |
| 2004/0006909 | A1* | 1/2004 | Essad | A01K 85/16 43/42.22 |
| 2009/0300964 | A1* | 12/2009 | Nemethy | A01K 85/16 43/4.5 |
| 2012/0144723 | A1* | 6/2012 | Davidson | A01K 85/01 43/17.6 |
| 2015/0342166 | A1* | 12/2015 | McWilliams | A01K 85/16 43/42.04 |
| 2016/0007581 | A1* | 1/2016 | Davidson | A01K 85/02 43/17.1 |

* cited by examiner

VARIABLE DEPTH FISHING LURE

BACKGROUND OF THE INVENTION

1. Field of the Invention

The present invention relates generally to fishing and more specifically to a variable depth fishing lure, which may be configured by changing a position of an adjustable bill.

2. Discussion of the Prior Art

It appears that the prior art does not teach or suggest a crank bait, which includes an adjustable bill and multiple line holes in a top and front of the lure for changing a fulcrum point thereof.

Accordingly, there is a clearly felt need in the art for a variable depth fishing lure, which includes a two position adjustable lip and multiple line eyelets.

SUMMARY OF THE INVENTION

The present invention provides a variable depth fishing lure, which may be configured by changing the position of an adjustable bill. The variable depth fishing lure preferably includes a hollow body, an adjustable bill, a spring pin, a spring retainer and at least one treble hook. The hollow body preferably includes a first body half and a second body half. At least two horizontal bill slots are formed on a front of the hollow body. The adjustable bill includes a duck bill shape. A curved body boss is formed on one end of the adjustable bill. A horizontal projection extends from an inside surface of the curved body boss. The horizontal projection is sized to be received by one of the at least two horizontal bill slots. One end of the spring pin is pivotally retained at the one end of the adjustable bill. The spring retainer is pivotally retained in the hollow body. A spring pin hole is formed through the spring retainer to receive the spring pin. An opposing end of the spring pin is inserted into a compression spring. The opposing end of the spring pin is terminated with a nut or the like to retain the compression spring. To change a position of the adjustable bill, an opposing end of the adjustable bill is pulled away from the hollow body and moved vertically for insertion into an adjacent horizontal slot. The compression spring biases the adjustable bill against the front of the hollow body.

A hooking device preferably includes a multi-position line eyelet, a hook line and at least one hook. The multi-position line eyelet includes a plurality of holes for the attachment of a fishing line or a leader line. One end of the hook line extends from the multi-position eyelet and at least one hook extends from an opposing end of the hook line. The multi-position line eyelet is retained between the first and second body halves at substantially a top thereof. The hook line is retained in a line groove formed in at least one of the first and second body halves. The multi-position line eyelet could be replaced with a single line eyelet.

Accordingly, it is an object of the present invention to provide a variable depth fishing lure, which includes an adjustable bill and a multi-position line eyelet.

These and additional objects, advantages, features and benefits of the present invention will become apparent from the following specification.

DETAILED DESCRIPTION OF THE PREFERRED EMBODIMENTS

Figure 1:
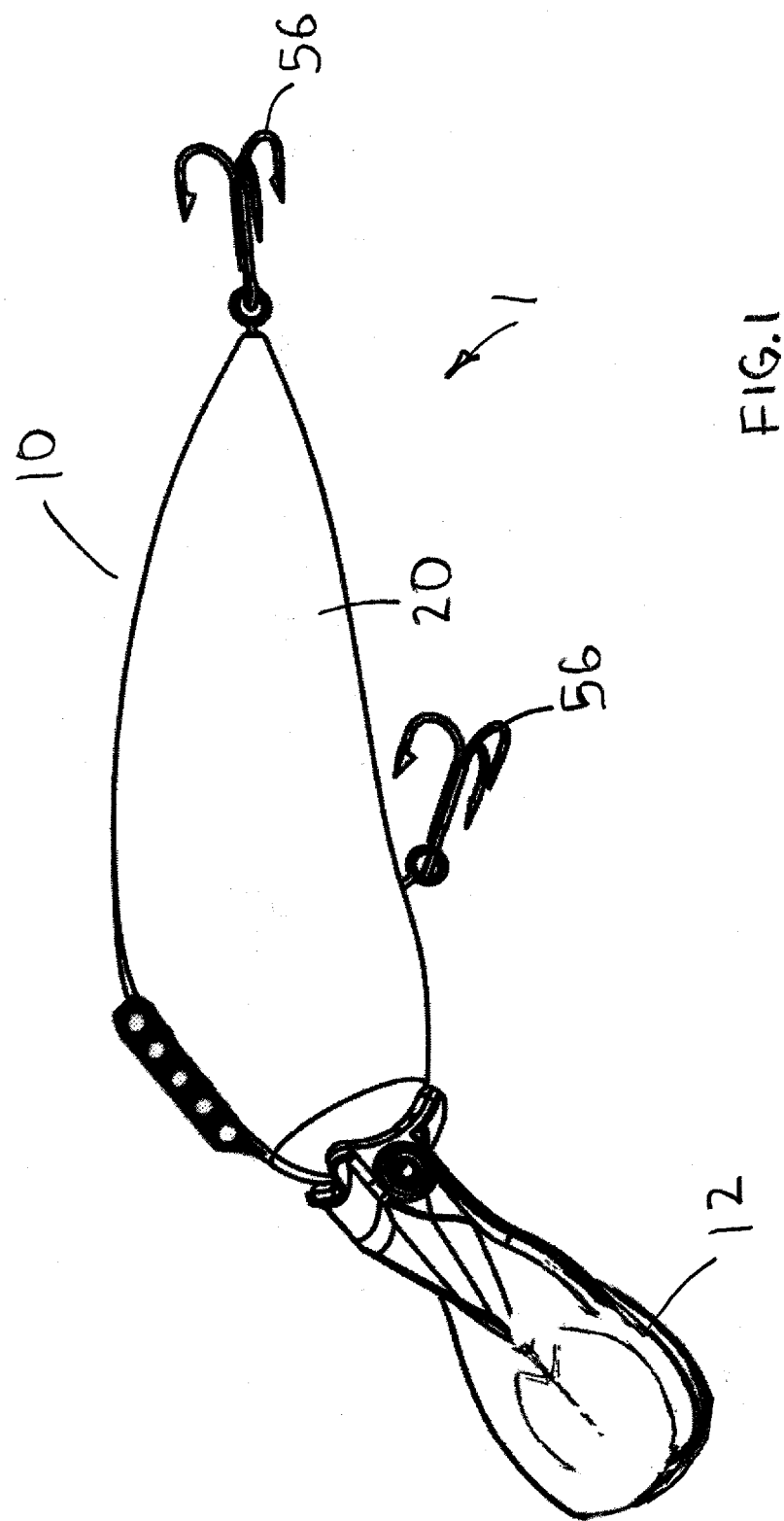
FIG. 1 is a perspective view of a variable depth fishing lure in accordance with the present invention.
Figure 2:
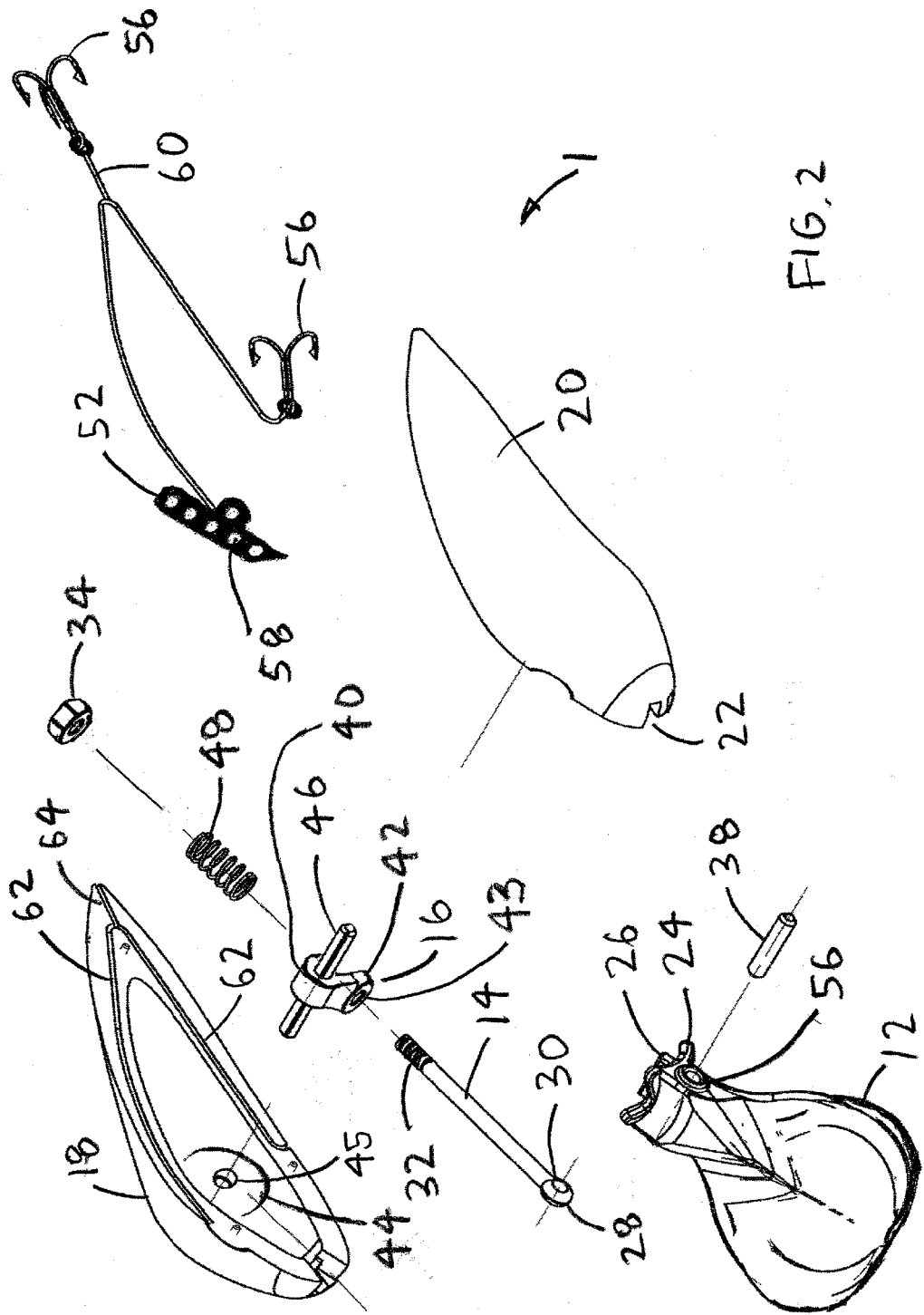
FIG. 2 is an exploded perspective view of a variable depth fishing lure in accordance with the present invention.
Figure 3:
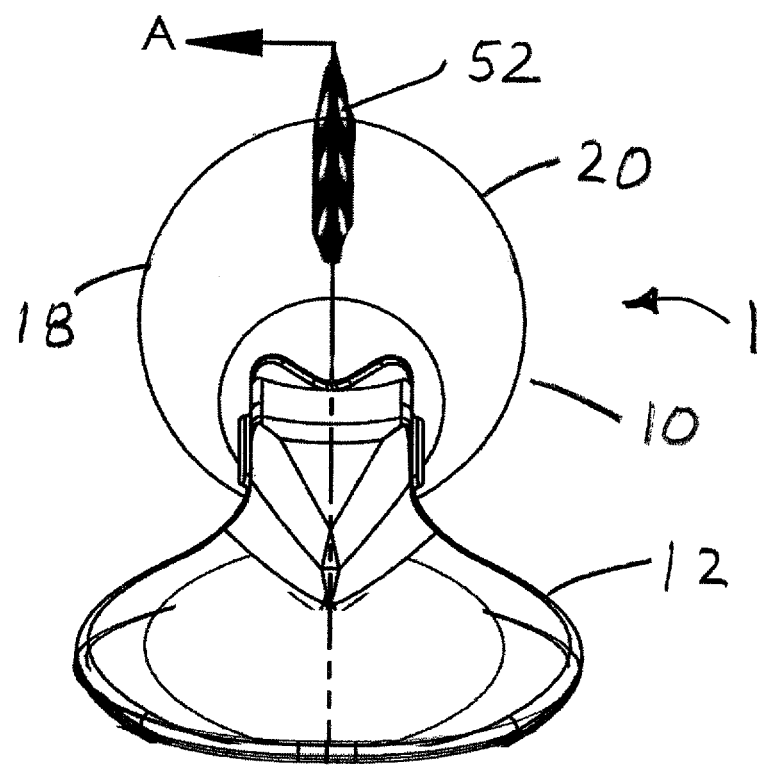
FIG. 3 is a front view of a variable depth fishing lure in accordance with the present invention.
Figure 4:
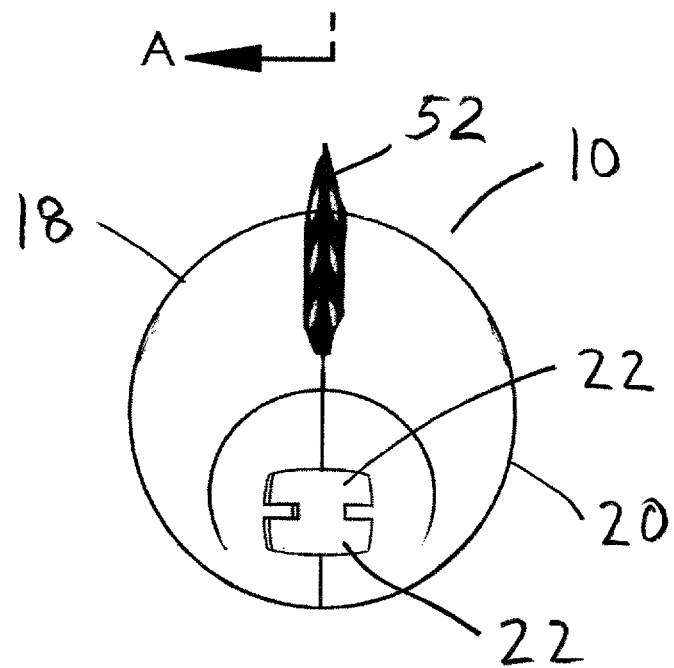
FIG. 4 is a front view of a variable depth fishing lure without an adjustable bill attached thereto in accordance with the present invention.
Figure 5:
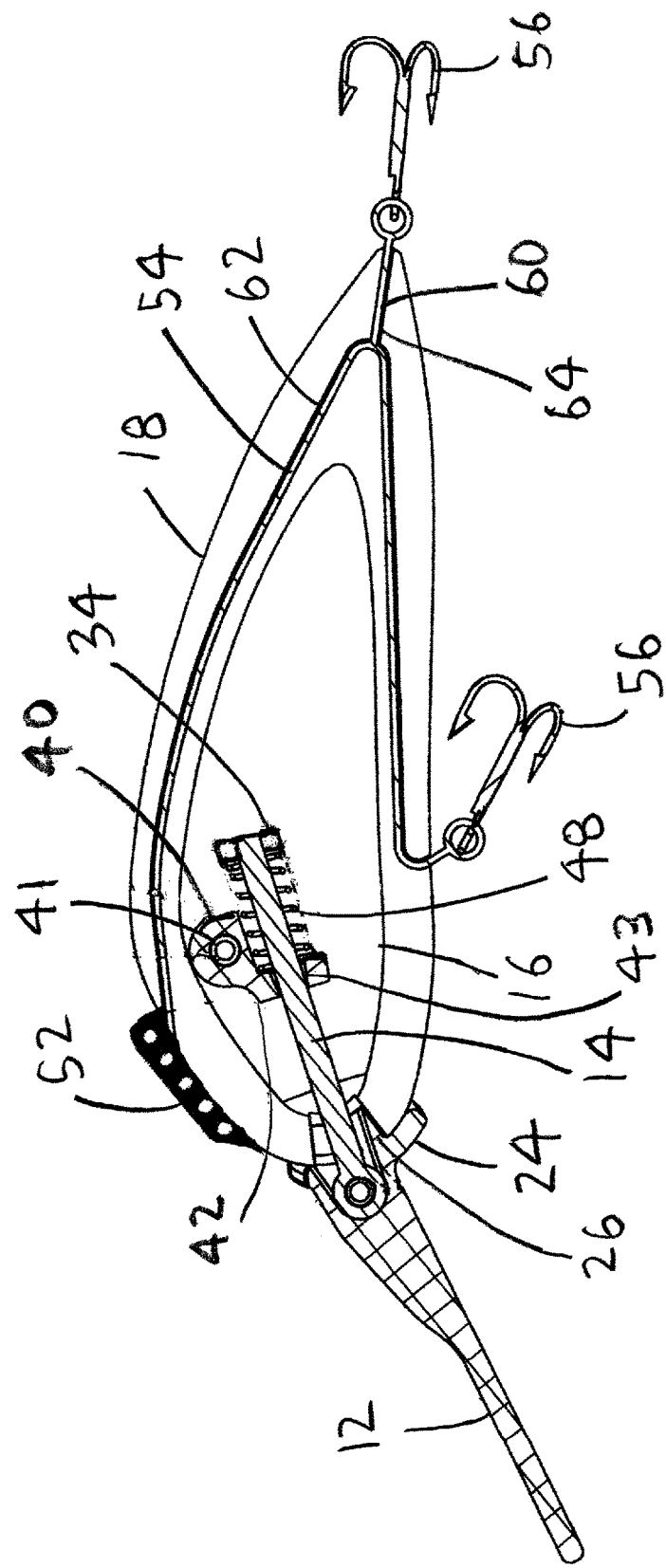
FIG. 5 is a cross sectional view of a variable depth fishing lure cut through FIG. 3 in accordance with the present invention.

With reference now to the drawings, and particularly to FIG. 1, there is shown a perspective view of a variable depth fishing lure 1. With reference to FIGS. 2-5, the variable depth fishing lure 1 preferably includes a hollow body 10, an adjustable bill 12, a spring pin 14, a spring retainer 16 and at least one treble hook. The hollow body 10 preferably includes a first body half 18 and a second body half 20. The adjustable bill 12, the spring retainer 16, and the first and second body halves 18, 20 are preferably fabricated by a plastic molding process. At least two horizontal bill slots 22 are formed in a front of the first and second body halves 18, 20. The adjustable bill 12 includes a duck bill shape and a curved body boss 24. The curved body boss 24 is formed on one end of the adjustable bill 12. A horizontal projection 26 extends from an inside surface of the curved body boss 24. The horizontal projection 26 is sized to be received by one of the at least two horizontal bill slots 22.

A pin boss 28 is formed on one end of the spring pin 14. A pin hole 30 is formed through the pin boss 28. A thread 32 is preferably formed on an opposing end of the spring pin 14 to threadably receive a nut 34. A bill pin hole 36 is formed through the one end of the adjustable bill 12. A bill pin 38 is inserted into the bill pin hole 36 and through the pin hole 30 to pivotally connect the adjustable bill 12 to the spring pin 14. The bill pin 38 is perpendicular to the spring pin 14. The spring retainer 16 includes a pivot base 40 and a spring flange 42. The spring flange 42 extends downward from the pivot base 40. A retainer pivot hole 41 is formed through the pivot base 40 and a spring pin hole 43 is formed through the spring flange 42. A pivot boss 44 is formed inside the first and second body halves 18, 20. A body pivot hole 45 is formed in the pivot boss 44 to receive a retainer pin 46. The spring retainer 16 is pivotally retained relative to the hollow body 10 by inserting the retainer pin 46 into the first and second body halves 18, 20 and through the spring retainer 16.

An opposing end of the spring pin 14 is inserted through the compression spring 48. The nut 34 is threaded on to the thread 32 of the spring pin 14 to retain the compression spring 48. The spring pin 14 is perpendicular to the retainer pin 46. However, other methods and devices may be used to replace the nut 34. To change a position of the adjustable bill 12 relative to the hollow body 10, an opposing end of the adjustable bill 12 is pulled away from the hollow body 10 and moved vertically for insertion into an adjacent horizontal slot 22.

A hooking device 50 preferably includes a multi-position line eyelet 52, a hook line 54 and at least one treble hook 56. The multi-position eyelet 52 includes a plurality of holes 58 for the attachment of a fishing line or a leader line. One end of the hook line 54 extends from the multi-position eyelet 52 and the treble hook 56 extends from an opposing end of the hook line 54. A second treble hook 56 preferably extends from a hook line extension 60, which extends from substantially a middle of the hook line 54. The multi-position line eyelet 52 is retained between the first and second body halves 18, 20 at substantially a top thereof. The hook line 54 is preferably retained in a line groove 62 formed in at least one of the first and second body halves 18, 20. The hook line extension 60 is retained in a line groove 64 formed in at least one of the first and second body halves 18, 20. The multi-position line eyelet 52 could be replaced with a single line eyelet. A waterproof sealant is placed between the first and second body halves 18, 20.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A variable depth fishing lure comprising:
a hollow body includes a first body half and a second body half, at least two slots are formed in a front of at least one of said first and second body halves;
an adjustable bill having a shape of a duck bill, a projection extending from one end thereof, said projection being retained in one of said at least two slots;
a line eyelet is located on top and at substantially a front of said hollow body, said line eyelet includes at least one hole for the attachment of a fishing line;
a first treble hook extending from a rear of said hollow body, a second treble hook extending from a bottom of said hollow body; and
a device for biasing said adjustable bill against said front of said hollow body, wherein said device includes a spring pin, a spring retainer and a compression spring, one end of said spring pin is pivotally connected to said adjustable bill, said spring retainer is pivotally retained by said hollow body, an opposing end of said spring pin is inserted through said spring retainer and said compression spring, said opposing end of said spring pin is terminated to retain said compression spring.

2. The variable depth fishing lure of claim 1 wherein:
said spring pin is terminated by threading a nut on said opposing end.

3. The variable depth fishing lure of claim 1, further comprising:
a hook line is attached to said line eyelet and said first and second treble hooks, a line groove is formed in at least one of the first and second body halves to retain said hook line.

4. The variable depth fishing lure of claim 1 wherein:
said first and second body halves are fabricated by a plastic molding process.

5. A variable depth fishing lure comprising:
a hollow body includes a first body half and a second body half, at least two slots are formed in a front of at least one of said first and second body halves;
an adjustable bill having a shape of a duck bill, a projection extending from one end thereof, said projection being retained in one of said at least two slots;
a spring pin having one end pivotally engaged with said adjustable bill, an opposing end of said spring pin is biased to pull said adjustable bill against said front of said hollow body;

a line eyelet is located on top and at substantially a front of said hollow body, said line eyelet includes at least one hole for the attachment of a fishing line;
a first treble hook extending from a rear of said hollow body, a second treble hook extending from a bottom of said hollow body; and
a spring retainer is pivotally retained in said hollow body, said opposing end of said spring pin is retained in said spring retainer, said opposing end of said spring pin is terminated to retain a compression spring against said spring retainer.

6. The variable depth fishing lure of claim 5 wherein:
said spring pin is terminated by threading a nut on said opposing end thereof.

7. The variable depth fishing lure of claim 5, further comprising:
a hook line is attached to said line eyelet and said first and second treble hooks, a line groove is formed in at least one of the first and second body halves to retain said hook line.

8. The variable depth fishing lure of claim 5 wherein:
said first and second body halves are fabricated by a plastic molding process.

9. A variable depth fishing lure comprising:
a hollow body includes a first body half and a second body half, at least two slots are formed in a front of at least one of said first and second body halves;
an adjustable bill having a shape of a duck bill, a projection extending from one end thereof, said projection being retained in one of said at least two slots;
a hook device includes a line eyelet, a hook line and at least one treble hook, said line eyelet is located on top and at substantially a front of said hollow body, said line eyelet includes a plurality of holes for the attachment of a fishing line, one end of said hook line extends from said line eyelet, said at least one treble hook extends from the other end of said hook line;
a spring pin having one end pivotally engaged with said adjustable bill, an opposing end of said spring pin is biased to pull said adjustable bill against said front of said hollow body;
a spring retainer is pivotally retained in said hollow body, said opposing end of said spring pin is retained in said spring retainer.

10. The variable depth fishing lure of claim 9, further comprising:
a device for biasing said adjustable bill against said front of said hollow body.

11. The variable depth fishing lure of claim 9, further comprising:
said opposing end of said spring pin is terminated to retain a compression spring against said spring retainer.

12. The variable depth fishing lure of claim 11 wherein:
said spring pin is terminated by threading a nut on said opposing end thereof.

13. The variable depth fishing lure of claim 9 wherein:
a line groove is formed in at least one of the first and second body halves to retain said hook line.

14. The variable depth fishing lure of claim 9 wherein:
said first and second body halves are fabricated by a plastic molding process.

* * * * *